Figure 1:
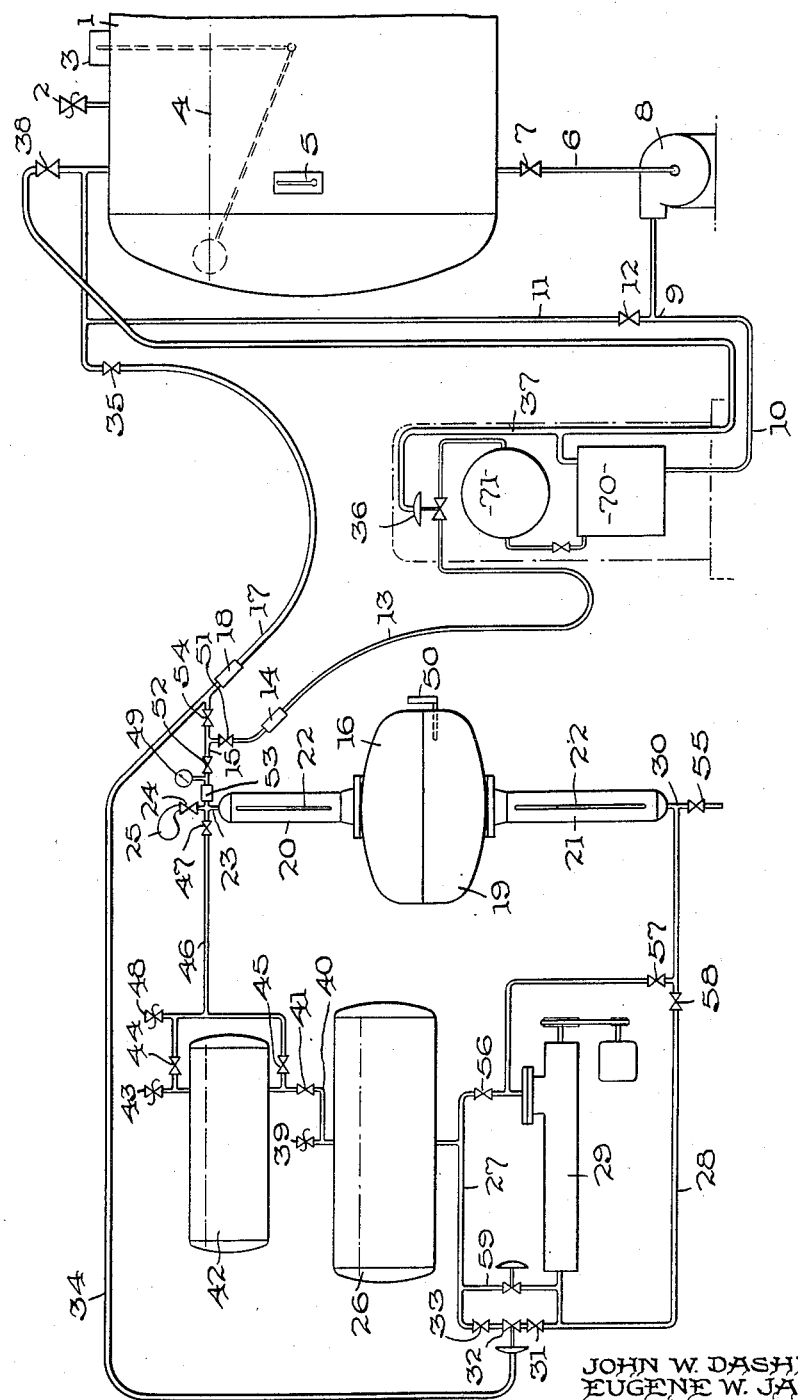

Nov. 10, 1959    J. W. DASHIELL, JR., ET AL    2,911,820
METHOD OF AND APPARATUS FOR TESTING LIQUEFIED GAS METERS
Filed March 9, 1955    2 Sheets-Sheet 1

INVENTORS
JOHN W. DASHIELL, JR.
EUGENE W. JACOBSON
BY
*Horace Booker*
ATTORNEY

Nov. 10, 1959  J. W. DASHIELL, JR., ET AL  2,911,820
METHOD OF AND APPARATUS FOR TESTING LIQUEFIED GAS METERS
Filed March 9, 1955  2 Sheets-Sheet 2

INVENTORS
JOHN W. DASHIELL, JR.
EUGENE W. JACOBSON
BY
ATTORNEY

United States Patent Office 2,911,820
Patented Nov. 10, 1959

2,911,820

METHOD OF AND APPARATUS FOR TESTING LIQUEFIED GAS METERS

John W. Dashiell, Jr., Pittsburgh, and Eugene W. Jacobson, Oakmont, Pa., assignors to Gulf Research & Development Company, Pittsburgh, Pa., a corporation of Delaware Application March 9, 1955, Serial No. 493,235

7 Claims. (Cl. 73—3)

This invention relates to improvements in testing positive displacement liquid meters for use with liquefied petroleum gas or other high volatile liquids, and it comprises a method of and apparatus for such use, which embody improvements and reorganization of the method and apparatus of Patent No. 2,050,800..

An object which is achieved by this invention is the provision of an apparatus and method whereby meters for liquefied gases may be tested and calibrated without introduction of error. Among the causes of such error are possible leakage, vaporization or venting of the liquid used in testing, volumetric changes in the liquid due to temperature variation, and its absorption and deterioration, all of which the system of the present invention is designed to prevent or avoid.

With the foregoing and other objects in view which will be apparent from the following description, these improvements consist in the method of and means for testing positive displacement liquefied petroleum gas meters wherein the liquefied petroleum gas is contained in a storage tank which is connected through suitable conduits to the meter to be tested and thence to a volume measuring receptacle or prover tank containing a liquid immiscible with and of different density than the liquefied petroleum gas. The system is so constructed and operated that the test liquid is maintained out of contact with air and under a sufficient and continuous back pressure during its transfer from the storage tank, through the meter to be tested, and into the prover tank to prevent its vaporization during any phase of the transfer operation. Such vaporization would result in a liquid measurement error by the meter or in the prover tank and possible deterioration of the test liquid.

Passage of the test liquid in either direction is accomplished by forcing it from the storage tank through the meter to be tested and into the prover tank to displace an equal volume of the immiscible liquid from the latter, or by forcing the immiscible liquid into the prover tank to displace the test liquid back into the storage tank, through the meter, depending upon the direction of flow desired.

The immiscible liquid is held in a supply tank, the vapor space of which is connected to a second tank of the liquefied petroleum gas used in testing. Thus, the immiscible liquid is maintained out of contact with the air and under a pressure in the vapor space of substantially the same magnitude as that existing in the prover tank. In such a closed system, the amount of dissolved liquefied petroleum gas in the immiscible liquid is therefore practically constant.

For the purpose of testing positive displacement liquefied gas meters, two interconnecting conduits are provided, one for passage of the liquid used for the test from the storage tank to the prover tank through the meter to be tested and the other for return of the liquid so passed from the prover tank back to the storage tank, by-passing the meter. The prover tank is provided with a sight gage whereby the interface between the two liquids is visible and displacement of one liquid by the other may be measured. In testing, a certain volume of test liquid is forced from the storage tank through the meter into the prover tank where the volume of immiscible liquid displaced is accurately measured by noting the change of level of the interface in the sight gage. When the metered volume of test liquid has been checked by the prover tank, it is returned to the storage tank through the return conduit by exerting pressure on the immiscible liquid in contact with the test liquid in the prover tank. Direction and rate of flow are controlled by suitable valves in the various conduits.

Alternatively, in testing a meter the test liquid may be forced from the prover tank through the meter to be tested to the storage tank, the meter reading being checked against the amount of liquid which is displaced from the prover tank and then that volume returned to the prover tank from the test liquid storage tank through the return conduit. The result is the same whether the test liquid is passed from the storage tank through the meter to displace the immiscible liquid in the prover tank, or whether a measured volume of the test liquid in the prover tank is displaced by immiscible liquid and is thereby forced through the meter to the storage tank.

On one side of the system centering in the prover tank, the test liquid is maintained in a continuous liquid phase from the storage tank through the meter to the prover tank by maintaining an adequate and continuous pressure on it by the immiscible liquid. On the other side of the system, gas entrainment in the immiscible liquid is prevented by maintaining a substantial and continuous pressure on the immiscible liquid by liquid pressure supplied from the second liquefied petroleum gas tank which is connected to the space above the immiscible liquid in the immiscible liquid supply tank.

Thermometers are provided for indicating the temperature of the test liquid in the storage tank as well as in the prover tank, whereby volumetric changes in the test liquid due to thermal changes in passing from the storage tank to the prover tank may be calculated and this source of error corrected in comparing volume changes in the prover tank with volume indicated by the meter.

Figure 2:
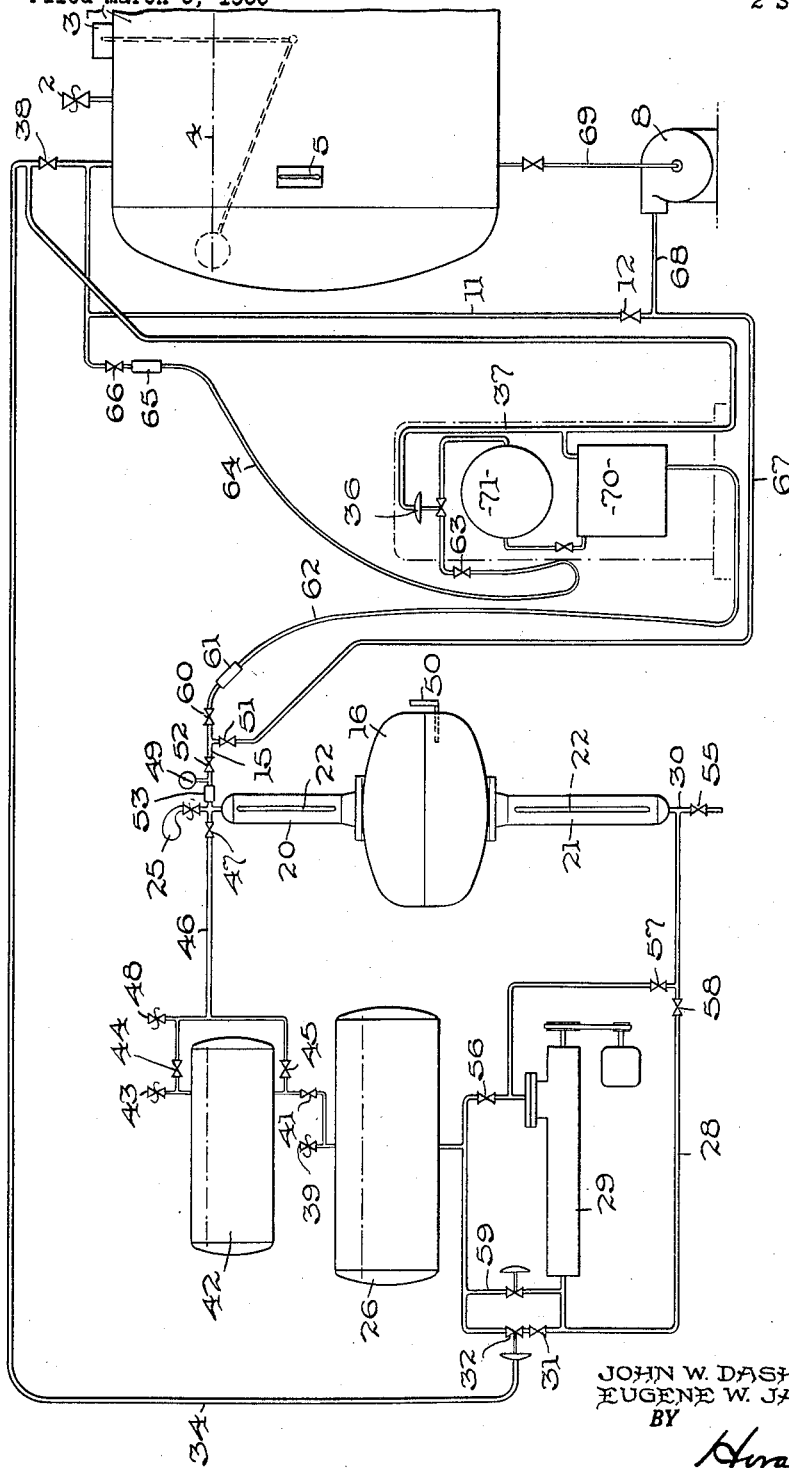

The principle upon which these improvements are based may be readily understood by reference to the accompanying drawings wherein are illustrated more or less diagrammatically two specific forms of apparatus within the purview of the present invention:

Fig. 1 is a schematic view showing one organization of such apparatus in which the liquefied petroleum gas constituting the test liquid flows through the test meter and to the prover tank from which it displaces immiscible liquid; and Fig. 2 is a similar view showing a modified organization of the apparatus in which the liquefied petroleum gas is adapted to be discharged in measured volume from the prover tank, through the meter under test and to the storage tank.

Referring to the drawings and first to Fig. 1, the reference numeral 1 indicates in general a closed supply tank for the test liquid which in this particular instance is liquefied petroleum gas held under its own vapor pressure in a tank constructed to withstand the pressures normally encountered in this service and protected by adequate safety relief equipment 2. A liquid level gage 3 is provided to indicate the level of the liquefied petroleum gas 4 in tank 1, and a thermometer 5 indicates the temperature of the liquid.

Liquid from the tank 1 flows through a conduit 6, which is controlled by valve 7, to a pump 8 and thence through the T-connection 9 and conduit 10 to a dispensing unit 70 and meter 71 and associated equipment under test. From the opposite branch of T-connection 9 a conduit 11, which is controlled by valve 12, extends to the top of storage tank 1 and discharges into the vapor space therein.

Liquid flowing through the meter 71 under test continues onward through conduit 13 and quick-disconnect 14 to a valved branch conduit 15 which enters the top of a prover tank which is indicated generally at 16. The branch conduit 15 also communicates with a valved return conduit 17 and quick-disconnect 18 to the top of the storage tank 1.

The prover tank 16 comprises two substantially hemispherical tank heads forming a center portion 19 from which narrow cylindrical ends 20 and 21 extend upward and downward, each such end having a sight gage 22 which is suitably graduated for accuracy of measurement.

The curved heads of the center portion of the prover tank direct any entrained gas bubbles up through the liquid in the tank to the top connection 23 and pressure relief valve 24 through which the tank may be completely purged before starting a test. After purging the tank of all gas or air, the leakage telltale 25 is attached to the discharge connecticon of the relief valve 24. This leakage telltale 25 is constructed of an impermeable flexible fabric in a ballroom form and of relatively low pressure strength such that any passage of gas or liquid through the relief valve 24 is shown by expansion of the telltale, and the effectiveness of the safety features of valve 24 is in no way impaired.

A closed tank 26 containing a liquid which is immiscible with the liquefied gas test liquid connects through conduits 27 and 28 to the lower cylindrical extension 21 of the prover tank. A pump 29 is provided for forcing the immiscible liquid into the prover tank to displace the test liquid. The immiscible liquid is thereafter returned through the connection 30 at the bottom of the prover tank and conduit 28 which is provided with a quick-acting valve 31, back-pressure valve 32 and flow-regulating valve 33 into the immiscible liquid supply tank 26. The diaphragm of the back-pressure valve 32 is connected to the vapor space of the liquefied petroleum gas storage tank 1 through a suitable conduit 34, quick-acting disconnect 18, conduit 17 and valve 35, and is so set as to maintain a back pressure on the liquid in the prover tank substantially above the vapor pressure in the liquefied petroleum gas tank 1 and of a magnitude sufficient to prevent flashing into vapor of any of the liquefied petroleum gas in passing through the meter or into the prover tank. A second back-pressure valve 36 is located in the conduit 13 on the discharge side of the meter 71 and is also connected to the vapor space in storage tank 1 by means of conduit 37 which is controlled by valve 38. The back-pressure valve 32 will be set to maintain a pressure slightly in excess of that provided by the back-pressure valve 36 whereby the back pressure within the system will be essentially and at all times under the control of back-pressure valve 32.

The immiscible liquid tank 26 is provided with safety relief equipment 39 and is connected through a conduit 40 and valve 41 to a liquefied petroleum gas tank 42 so that the immiscible liquid in tank 26 is maintained in contact with and under the pressure of the liquefied petroleum gas in tank 42 in which it is confined under its own vapor pressure. The liquefied petroleum gas tank 42 is provided with safety relief equipment and valves 44 and 45 so located as to permit the transfer of either vapor or liquid to the top of the prover tank 16 through conduit 46 and valve 47. Conduit 46 extending between valves 44, 45 and 47 is protected by suitable safety relief equipment 48.

The pressure and temperature of the test liquid in the prover tank are measured by pressure gage 49 and thermometer 50.

Flow from the meter to be tested to the prover tank 16 is through conduit 13, quick-disconnect 14, quick-acting valves 51 and 52, visigage 53 and connection 23. The return flow from the prover tank 16 to the liquefied petroleum storage tank 1 is controlled by quick-acting valve 54, quick-disconnect 18, conduit 17 and valve 35. The prover tank may be drained at valve 55.

By proper manipulation of valves 31, 56, 57 and 58 in the immiscible liquid circulating system, the pump 29 may be operated to pump from the immiscible liquid tank 26 into the prover tank 16, or to pump from the prover tank into the immiscible liquid tank. Valves 31, 32 and 33 in the immiscible liquid circulating system may be by-passed by the valve-controlled conduit 59.

At the start of a meter testing operation on a typical dispensing unit, the meter 71 to be tested, having been connected to discharge through back-pressure valve 36, conduit 13 is connected by means of quick-disconnect 14, and conduit 17 is connected by means of quick-disconnect 18, to the meter prover tank, as shown. The pump 8 is started and with the valve 52 closed and valves 51, 54 and 35 open a circulation of the test liquid is made through conduits 6 and 10 to purge the lines. With valves 31 and 57 closed, and valves 56 and 58 open, the immiscible liquid pump 29 is started and the prover filled until liquid escapes through relief valve 24 at which time valve 58 is closed and pump 29 is stopped. Then, with valve 44 closed and valves 45 and 47 open, valve 57 is opened slightly to permit the liquefied petroleum gas from tank 42 to fill conduit 46, connection 23, visigage 53, pressure gage 49 and the interconnecting conduit to valve 52, and to follow the receding level of the immiscible liquid in the prover tank 16 until the liquid interface reaches a predetermined level in sight gage 22, at which point valve 57 is closed and relief valve 24 is manually opened slightly until liquefied petroleum gas discharges. Thereupon, valves 24 and 47 are closed and leak detector 25 is attached to valve 24.

Valve 33 is now set for the proper flow rate and, with the dispensing unit pump 8 operating, valve 54 is closed and valves 52 and 58 opened, following which quick-acting valve 31 is opened permitting the metered test liquid to be forced into the meter prover until the interface is displaced from the starting point in sight gage 22 to a predetermined final level. Upon the liquid interface reaching this final level, quick-acting valves 31, 51 and 52 are closed and the dispensing unit pump is stopped. The quantity registered by the meter is then compared with that shown by the prover and the meter error determined. Correction for volumetric changes in the liquefied gas between the storage tank 1 and the prover tank 16 may be calculated from the recorded temperatures and pressures in these two vessels.

Valves 52 and 54 are next opened and immiscible liquid pump 29 is started, whereby the immiscible liquid is drawn from tank 26 and forced to the prover tank 16 where it displaces the liquefied petroleum gas through the conduit 17 into the storage tank 1 until the interface reaches the predetermined starting point in sight gage 22, at which point valves 52 and 54 are closed and the apparatus thus is made ready for the start of another test run. Any leakage of valve 24 during such a test will be indicated by the telltale 25 and in such case the test must be repeated.

Fig. 2 of the drawings illustrates a modified form of apparatus employing the same elements as are shown in Fig. 1, but these elements are organized and connected in a different manner in order to effect measurement of the test liquid before passing it through the meter. In this modified apparatus the pump 8 is connected directly to the prover tank 16 through quick-acting valve 51. The discharge from the prover tank is connected through valve 60, quick-disconnect 61 and conduit 62 to the inlet of the dispensing unit 70. The discharge from the dispensing unit is taken from the meter 71, through the back-pressure valve 36 and then through the flow control valve 63, conduit 64, quick-disconnect 65 and valve 66 and is returned to the liquefied gas storage tank 1. The conduit 34 from the diaphragm chamber of back-pressure valve 32 in this modification is extended to connect directly to the vapor space in the liquefied gas storage tank 1.

With the above-stated changes in arrangement of apparatus we are enabled to pass liquid used for the test from the prover tank 16 through the meter 71 and thence to the storage tank 1. Having checked the meter reading against displacement volume through the prover tank, the liquid may be returned to the prover tank through conduits 67, 68 and 69 from the storage tank by means of the pump 8.

In both of the modifications shown in Figs. 1 and 2, liquid passing through the meter and the prover tank is subjected to a back pressure by means of either or both valves 32 and 36 and as a consequence vaporization of the liquid under test is effectively prevented. The setting of the back-pressure valves 32 and 36 may be varied according to the character of test liquid which is used.

Air entrainment or deterioration of the test liquid is prevented by confining it under pressure of an immiscible liquid which is maintained air-free by being blanketed by the liquid used for test, or by its vapors. Advantageously, the immiscible liquid may be colored with a dye which is insoluble in petroleum products, specifically liquefied petroleum gases, thereby facilitating easy determination of the liquid interface in the sight gage of the prover tank.

Various changes may be made in the mode of operation and in the details of apparatus without departing from the scope of this invention. For example, while we have described in particular a method wherein liquefied petroleum gas used in testing the meter is displaced by an immiscible liquid, the improvement is equally well adapted for testing meters with volatile liquids other than liquefied petroleum gas. Also, while the apparatus illustrated is adapted for testing the meter with a liquid which is lighter than the immiscible liquid used to displace it, the apparatus may be readily adapted for testing with a liquid heavier than the immiscible liquid used to displace it.

What we claim as our invention:

1. A method of testing meters for measuring highly volatile liquid which in its transfer during tests is held under pressure to maintain it in liquid state, comprising the steps of establishing and maintaining a supply body of the volatile liquid for which the meter is to be tested, establishing and maintaining a second body of said liquid in contact with a supply body of a second liquid immiscible therewith and out of contact with the air, maintaining back pressure on said supply body of second liquid under control of vapor pressure of said first-named supply body of liquid, forcing said immiscible liquid into a volume measuring receptacle to fill the same, displacing an amount of the immiscible liquid by forcing liquid from said first-named supply body into the volume measuring receptacle, thereafter forcing an additional volume of liquid from said first-named supply body through the meter being tested and into the volume measuring receptacle to displace an equal volume of the immiscible liquid, and correlating the change in level of liquid interface in the volume measuring receptacle with the meter reading.

2. A method of testing meters for measuring highly volatile liquid which in its transfer during measurement is maintained under continuous back pressure to avoid vaporization and in a closed system out of contact with air and diluents, comprising the steps of establishing and maintaining a supply body of volatile liquid for which the meter is to be tested, establishing and maintaining a second body of said liquid in contact with a supply body of a second liquid immiscible therewith, maintaining back pressure on said supply body of second liquid greater than the vapor pressure on the supply body of first liquid and sufficient to prevent the first liquid in contact therewith from vaporizing, conducting both first and second liquid to a measuring receptacle from the respective supply bodies thereof and adjusting their interface to a desired level, thereafter displacing one such liquid by forcing an additional volume of the other into the measuring receptacle, measuring the volume of such displacement as indicated by the meter being tested, and comparing the meter reading with the indicated change in level of the liquid interface in the measuring receptacle.

3. In the testing of meters for measuring liquefied petroleum gas, the method which comprises establishing and maintaining a main supply body of the liquefied petroleum gas, establishing and maintaining a second supply body of the liquefied gas in contact with a supply body of a second liquid immiscible therewith and of different density than the liquefied gas, maintaining back pressure on the second liquid supply body and the contacting body of liquefied gas through communication with the vapor space above said main supply body, conducting liquefied gas from said main supply body and immiscible liquid from the supply body thereof to a volume measuring receptacle, adjusting the observed interface of liquids in the volume measuring receptacle, displacing one such liquid by forcing the other into the volume measuring receptacle, measuring the displacement volume of liquefied petroleum gas by flowing the same through the meter to be tested while maintaining back pressure on its discharge from the meter, and comparing the meter reading change from initial reading with the indicated change in level of interface in the volume measuring receptacle.

4. The method of testing meters for measuring liquefied gases, which comprises forcing liquid from a supply body through the meter to be tested, maintaining back pressure from said supply body on the liquid so discharged from the meter and conducting said liquid into a second body thereof disposed within a standard measuring receptacle containing a second liquid immiscible with said first liquid and of different density than said first liquid, whereupon visible indication is established at the dividing line between the liquids, displacing said second liquid downwardly in said measuring receptacle by admission of first liquid thereto, comparing the liquid level indication with meter reading, and forcing the second liquid so displaced into a body of second liquid against back pressure of the supply body of said first liquid, and maintaining a third body of said first liquid in contact with said body of second liquid whereby the dissolved gas vapor and liquid content of the immiscible liquid is held substantially constant and at substantially the same pressure as that existing in the measuring receptacle.

5. Apparatus for testing volatile liquid flow meters comprising a closed container for the volatile liquid used in testing the meter, a volume measuring receptacle, and conduits connecting the container and volume measuring receptacle through a meter to be tested, a second closed container for the volatile liquid and a communicating container for a second liquid immiscible therewith, liquid conduits connecting said immiscible liquid container to a pump and thence to said volume measuring receptacle, a back-pressure valve between said meter and volume measuring receptacle, said valve having a vapor line connected to said first closed container, a second back-pressure valve between said container for immiscible liquid and said pump, a vapor line connecting said last-named valve with said first-named container for volatile liquid, and a pump for forcing volatile liquid from said first-named container to said volume measuring receptacle for flow through said meter upon displacement of one of the liquids in said measuring receptacle.

6. Apparatus for testing volatile liquid flow meters comprising a closed container for the volatile liquid used in testing the meter, a volume measuring receptacle, a liquid conduit connecting the lower portion of said container with one side of the meter to be tested, a liquid conduit connecting the other side of the meter to be tested and the upper portion of said volume measuring receptacle, a back-pressure valve in said second liquid conduit connected through a vapor conduit to the upper part of said closed container, a liquid conduit directly connecting the said closed container with the upper portion of said volume measuring receptacle and having valved connection to the conduit which extends from the meter to said volume measuring receptacle, thereby permitting a closed circuit to be established from the closed container through the meter and back to the closed container to purge the conduit of air and vapor preliminary to testing, a second closed container for the volatile liquid in communication with a closed container of a liquid which is immiscible therewith and which is maintained under the pressure of said volatile liquid out of contact with air and other contaminants, a liquid conduit extending from said container of immiscible liquid to a pump and thence to the lower part of said volume measuring receptacle, a back-pressure valve in the liquid conduit between the immiscible liquid container and pump, and a vapor line connecting said last-named back-pressure valve to said first-named closed container for the volatile liquid, said last-named valve exerting a greater back pressure than said first-named valve, and valve means between said immiscible liquid container and volume measuring receptacle for variously causing immiscible fluid to be forced by said pump into and out of the volume measuring receptacle and at other settings to permit controlled flow of the immiscible liquid back to its closed container as it is displaced from the volume measuring receptacle upon admission thereto of volatile liquid, whereby the volume of volatile liquid as indicated by the different levels of interfaces between the volatile and immiscible liquids in the volume measuring receptacle may be compared with volume indicated by the meter reading.

7. Apparatus for testing volatile liquid flow meters comprising a closed container for the volatile liquid used in testing the meter, a volume measuring receptacle, a liquid conduit connecting the lower portion of said container to the top of said volume measuring receptacle, a branch liquid conduit connecting the top of said volume measuring receptacle to the meter to be tested and returning from the discharge side of the meter to the closed container, a back-pressure valve in the conduit at the discharge side of the meter having a vapor conduit extending therefrom to the closed container, a second closed container for volatile liquid in communication with a closed container for a liquid immiscible therewith which is maintained under pressure of said volatile liquid out of contact with air and other contaminants, a liquid conduit extending from said container of immiscible liquid to a pump and thence to the lower part of said volume measuring receptacle, a back-pressure valve in the liquid conduit between the immiscible liquid container and pump, and a vapor line connecting said last-named back-pressure valve to said first-named closed container for the volatile liquid, said last-named valve exerting a greater back-pressure than said first-named valve, and valve means between said immiscible liquid container and volume measuring receptacle for variously causing the immiscible fluid to be forced by said pump into and out of the volume measuring receptacle and at other settings to permit controlled flow of the immiscible liquid back to its closed container as it is displaced from the volume measuring receptacle upon admission thereto of volatile liquid, whereby the volume of volatile liquid as indicated by the different level of interface between the volatile and immiscible liquids in the volume measuring receptacle may be compared with the volume indicated by the meter reading.

References Cited in the file of this patent

UNITED STATES PATENTS

| | | |
|---|---|---|
| 1,652,171 | Huff | Dec. 13, 1927 |
| 2,050,800 | Lane et al. | Aug. 11, 1936 |
| 2,710,537 | Schuler et al. | June 14, 1955 |